(12) United States Patent
Chuo

(10) Patent No.: US 7,845,794 B1
(45) Date of Patent: Dec. 7, 2010

(54) PLUG DEVICE FOR GLASSES

(76) Inventor: Chung En Chuo, No. 23, Lane 150, Longpu Street, Yongkang City, Tainan County 710 (TW)

( * ) Notice: Subject to any disclaimer, the term of this patent is extended or adjusted under 35 U.S.C. 154(b) by 0 days.

(21) Appl. No.: 12/546,810

(22) Filed: Aug. 25, 2009

(51) Int. Cl.
G02C 5/14 (2006.01)

(52) U.S. Cl. ............... 351/121; 351/140; 351/149
(58) Field of Classification Search ............... 351/111, 351/119, 121, 140, 142, 149, 150, 152
See application file for complete search history.

(56) References Cited

U.S. PATENT DOCUMENTS

2009/0059160 A1\* 3/2009 Chen .................... 351/140

\* cited by examiner

*Primary Examiner*—Huy K Mai
(74) *Attorney, Agent, or Firm*—Banger Shia

(57) ABSTRACT

A plug device for coupling a frame of a pair of glasses to one of a temple or a head strap buckle includes a socket member having a receptacle. The receptacle includes an outer lateral wall having an opening in communication with the receptacle. A button is moveably received in the opening. A resilient member is received in the receptacle and biases the button into the opening. A plug member includes a resilient hook releasably engaged in the receptacle. A distal end of the resilient hook is releasably received in the opening and abuts a peripheral wall of the opening. An outer end of the resilient hook abuts the inner end of the button. The button is pressable in the direction to disengage the distal end of the resilient hook from the opening, allowing the resilient hook to be removed from the receptacle of the socket member.

9 Claims, 3 Drawing Sheets

PLUG DEVICE FOR GLASSES

BACKGROUND OF THE INVENTION

1. Field of the Invention

The present invention relates to a plug device for glasses and, more particularly, to a plug device for removably coupling a frame to a temple or a head strap buckle of a pair of glasses, allowing easy replacement of the temple or a head strap buckle.

2. Description of the Related Art

The temples of a pair of glasses are generally hinged to a frame. Replacement of the temples requires special tools. Although temples can be utilized in sports goggles, head straps are generally required to reliably position the goggles on the face of the wearer. However, different devices for coupling with the temples or a head strap are required, which is troublesome and uneconomic.

Chinese Utility Model Publication Number ZL200720119984.0 discloses a lens frame and plug type replaceable temples. Each temple includes a mounting section hinged to the lens frame and a replaceable leg section. A plug is provided on a front end of the replaceable leg section. A receptacle is formed in a rear end of the mounting section. The plug is forcibly inserted into the receptacle such that the plug is securely received in the receptacle unless force is applied to pull the plug out of the receptacle. However, the coupling strength between the receptacle and the plug is poor. Namely, the plug can be easily pulled out of the receptacle. Furthermore, the service life of the plug/receptacle structure is relatively short. Namely, the plug/receptacle structure wears out after a period of time of use, leading to falling of the plug out of the receptacle.

BRIEF SUMMARY OF THE INVENTION

An objective of the present invention is to provide a plug device for removably coupling a frame to a temple or a head strap buckle of a pair of glasses, allowing easy replacement of the temple or the head strap buckle while reliable coupling the frame to the temple or the strap buckle.

A plug device for coupling a frame of a pair of glasses to one of a temple or a head strap buckle according to the preferred teachings of the present invention includes a socket member having a receptacle. The receptacle includes an outer lateral wall having inner and outer surfaces spaced in a direction. The outer lateral wall includes an opening extending from the outer surface through the inner surface in the direction and in communication with the receptacle. The opening includes a peripheral wall. A button is received in the opening and moveable in the direction. The button includes an inner end having a ledge. The ledge extends in another direction transverse to the direction to an extent beyond the opening, preventing the button from disengaging from the opening in the direction. A resilient member is received in the receptacle and abuts the inner end of the button. The resilient member biases the button into the opening. A plug member includes a first end and a second end. The first end of the plug member includes a resilient hook releasably engaged in the receptacle. The resilient hook includes a distal end and an outer end. The distal end of the resilient hook is releasably received in the opening and abuts the peripheral wall of the opening. The outer end of the resilient hook abuts the inner end of the button. The socket member is coupled to one of the temple and the head strap buckle, and the plug member is coupled to the other of the temple and the head strap buckle. The button is pressable in the direction to disengage the distal end of the resilient hook from the opening, allowing the resilient hook to be removed from the receptacle of the socket member. Replacement between the temple and the head strap buckle can be easily accomplished by pressing the button to disengage the resilient hook from the opening, removing the plug member from the receptacle, replacing the temple or the head strap buckle with a desired head strap buckle or temple, and then reinserting the resilient hook of the plug member into the receptacle.

Preferably, the resilient member is substantially U-shaped and has inner and outer sections and an intermediate portion interconnected between the inner and outer sections. The inner and outer sections are spaced in the direction.

Preferably, the inner end of the button includes a groove, and the outer section of the resilient member is engaged in the groove.

Preferably, the receptacle further includes an inner lateral wall spaced from the outer lateral wall in the direction. The resilient hook of the plug member includes a bend intermediate the outer section of the resilient member and the inner lateral wall of the receptacle in the direction.

Preferably, the bend of the resilient hook of the plug member includes first and second faces spaced in the direction. The second face of the bend abuts the inner lateral wall of the receptacle. The bend further includes a notch extending from the first face through the second face in the direction. The outer section of the resilient member is moved into the notch when the button is pressed in the direction.

Preferably, the socket member is coupled to the frame or integrally formed with the frame as a single monolithic piece, and the second end of the plug member is coupled to the temple or the head strap buckle. Alternatively, the second end of the plug member is coupled to the frame or integrally formed with the frame as a single monolithic piece, and the socket member is coupled to the temple or the head strap buckle.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
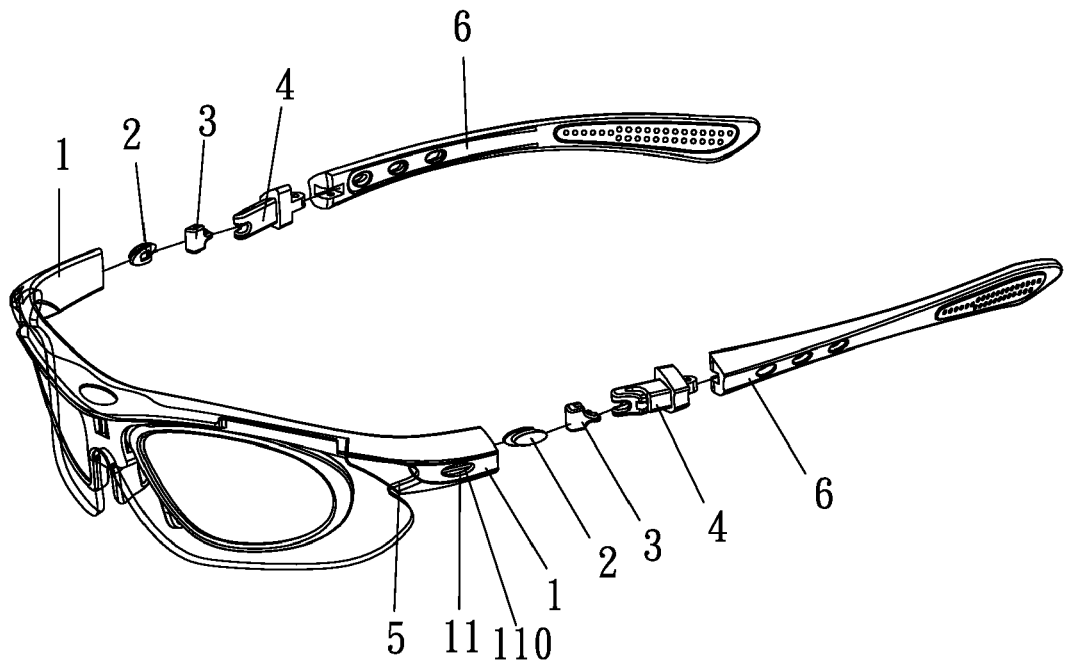
FIG. 1 shows an exploded, perspective view of a pair of glasses utilizing two plug devices according to the preferred teachings of the present invention.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

A plug device for glasses according to the preferred teachings of the present invention is shown in the drawings. In the preferred form shown, two plug devices are coupled to a frame 5 including or receiving two lenses. Each plug device couples the frame 5 of a pair of glasses to one of a temple 6 or a head strap buckle 7.

According to the preferred form shown, the plug device includes a socket member 1, a button 2, a resilient member 3, and a plug member 4. The socket member 1 includes a receptacle 12. The receptacle 12 includes inner and outer lateral walls 124 and 122 spaced in a direction. The outer lateral wall 122 has inner and outer surfaces 125 and 126 spaced in the direction. The outer lateral wall 122 includes an opening 11 extending from the outer surface 126 through the inner surface 125 in the direction and in communication with the receptacle 12. The opening 11 includes a peripheral wall 110.

The button 2 is received in the opening 11 and moveable in the direction. The button 2 includes inner and outer ends 24 and 26 spaced in the direction. The inner end 24 of the button 2 has a ledge 21 extending in another direction transverse to the direction to an extent beyond the opening 11, preventing the button 2 from disengaging from the opening 11 in the direction. The inner end 24 of the button 2 includes a groove 21.

The resilient member 3 is received in the receptacle 12 and abuts the inner end 24 of the button 2. The resilient member 3 biases the button 2 into the opening 11. In the most preferred form shown, the resilient member 3 is substantially U-shaped and has inner and outer sections 34 and 32 spaced in the direction and an intermediate portion 36 interconnected between the inner and outer sections 34 and 32. The outer section 32 of the resilient member 3 is engaged in the groove 21 of the button 2.

The plug member 4 includes a first end 43 and a second end 44. The first end 43 of the plug member 4 includes a resilient hook 41 releasably engaged in the receptacle 12. The resilient hook 41 includes a distal end 48 and an outer end 46. The distal end 48 of the resilient hook 41 is releasably received in the opening 11 and abuts the peripheral wall 110 of the opening 11. The outer end 46 of the resilient hook 41 abuts the inner end 21 of the button 2. The button 2 can be pressed in the direction to disengage the distal end 48 of the resilient hook 41 from the opening 11, allowing the resilient hook 41 to be removed from the receptacle 12 of the socket member 1. When the pressing force is released, the button 2 returns to its original position under the action of the resilient member 3, preventing the resilient hook 41 from disengaging from the opening 11. In the most preferred form shown, the resilient hook 41 of the plug member 4 includes a bend 49 intermediate the outer section 32 of the resilient member 3 and the inner lateral wall 124 of the receptacle 12 in the direction. The bend 49 includes first and second faces 491 and 492 spaced in the direction. The bend 49 further includes a notch 42 extending from the first face 491 through the second face 492 in the direction. The second face 492 of the bend 49 abuts the inner lateral wall 124 of the receptacle 12. When the button 12 is pressed in the direction, the outer section 32 of the resilient member 3 is moved into the notch 42. Thus, the notch 42 allows a user to press the button 2 with less effort.

Figure 2:
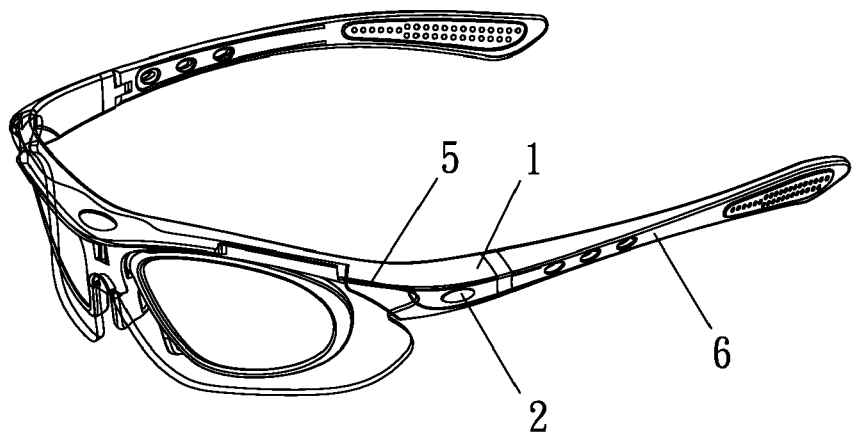
FIG. 2 shows a perspective view of the pair of glasses of FIG. 1.
Figure 3:
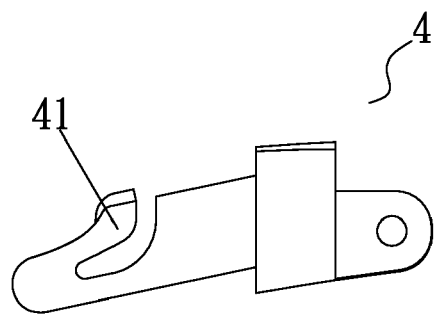
FIG. 3 shows a side view of a plug member of one of the plug devices of FIG. 1.
Figure 4:
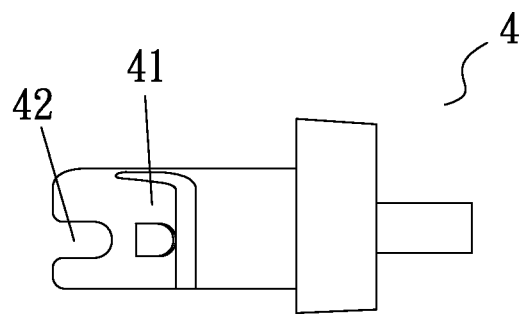
FIG. 4 shows a top view of the plug member of FIG. 3.
Figure 5:
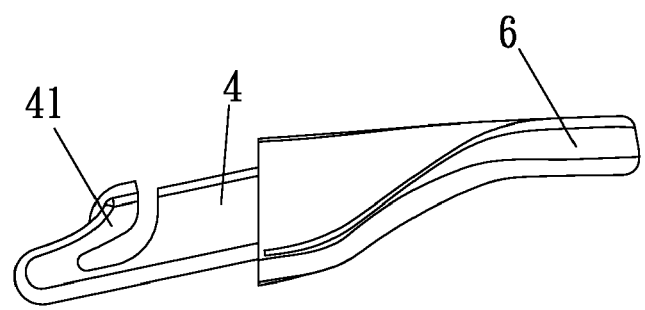
FIG. 5 shows a side view of the plug member of FIG. 3 and a temple coupled to the plug member.
Figure 6:
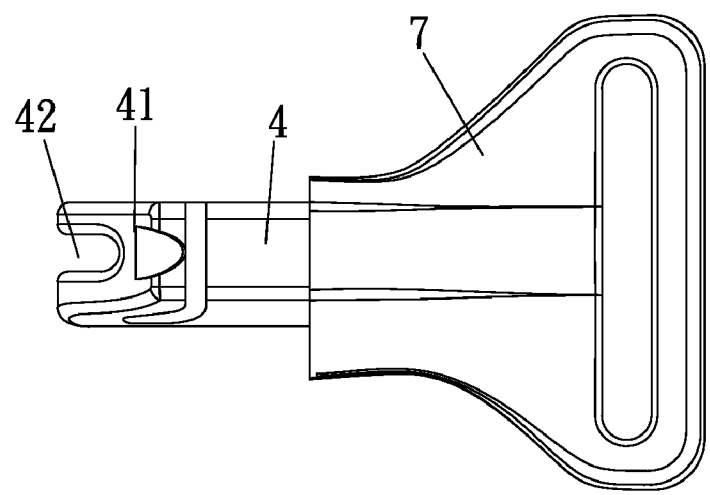
FIG. 6 shows a top view of the plug member of FIG. 3 and a head strap buckle coupled to the plug member.
Figure 7:
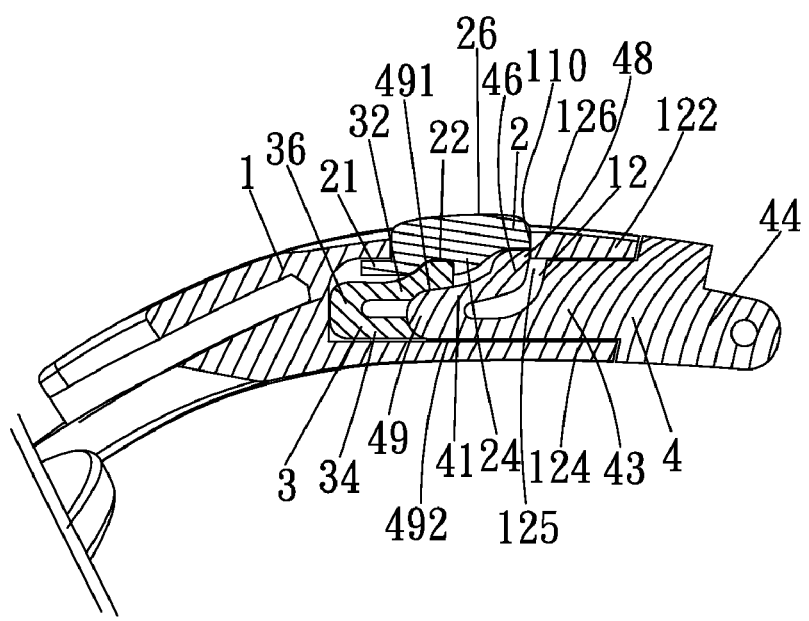
FIG. 7 shows a cross sectional view of the plug device according to the preferred teachings of the present invention.

In the preferred form shown, the socket member 1 is integrally formed with the frame 5 as a single monolithic piece, and the second end 44 of the plug member 4 is coupled to the temple 6 (FIGS. 1, 2, and 5) or the head strap buckle 7 (FIG. 6). It can be appreciated that the second end 44 of the plug member 4 and the temple 6 can be coupled by screwing or other coupling methods or by integral formation. Likewise, the second end 44 of the plug member 4 and the head strap buckle 7 can be coupled by screwing or other coupling methods or by integral formation. Alternatively, the second end 44 of the plug member 4 can be coupled to the frame 5 or integrally formed with the frame 5 as a single monolithic piece, and the socket member 1 can be coupled to the temple 6 or the head strap buckle 7.

Replacement between the temple 6 and the head strap buckle 7 or other temples and head strap buckles can be easily accomplished by pressing the button 1 to disengage the resilient hook 41 from the opening 11, removing the plug member 4 from the receptacle 12, replacing the temple 6 or the head strap buckle 7 with a desired head strap buckle or temple, and then reinserting the resilient hook 41 of the plug member 4 into the receptacle 12.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A plug device for coupling a frame of a pair of glasses to one of a temple or a head strap buckle, the plug device comprising:

a socket member including a receptacle, with the receptacle including an outer lateral wall having inner and outer surfaces spaced in a direction, with the outer lateral wall including an opening extending from the outer surface through the inner surface in the direction and in communication with the receptacle, with the opening including a peripheral wall;

a button received in the opening and moveable in the direction, with the button including an inner end having a ledge, with the ledge extending in another direction transverse to the direction to an extent beyond the opening, preventing the button from disengaging from the opening in the direction;

a resilient member received in the receptacle and abutting the inner end of the button, with the resilient member biasing the button into the opening; and a plug member including a first end and a second end, with the first end of the plug member including a resilient hook releasably engaged in the receptacle, with the resilient hook including a distal end and an outer end, with the distal end of the resilient hook being releasably received in the opening and abutting the peripheral wall of the opening, with the outer end of the resilient hook abutting the inner end of the button, with the socket member coupled to one of the temple and the head strap buckle, with the plug member coupled to another of the temple and the head strap buckle, with the button being pressable in the direction to disengage the distal end of the resilient hook from the opening, allowing the resilient hook to be removed from the receptacle of the socket member.

2. The plug device as claimed in claim 1, with the resilient member being substantially U-shaped and having inner and outer sections and an intermediate portion interconnected between the inner and outer sections, and with the inner and outer sections spaced in the direction.

3. The plug device as claimed in claim 2, with the inner end of the button including a groove, and with the outer section of the resilient member engaged in the groove.

4. The plug device as claimed in claim 3, with the receptacle further including an inner lateral wall spaced from the outer lateral wall in the direction, with the resilient hook of the plug member including a bend, and with the bend intermediate the outer section of the resilient member and the inner lateral wall of the receptacle in the direction.

5. The plug device as claimed in claim 4, with the bend of the resilient hook of the plug member including first and second faces spaced in the direction, with the second face of the bend abutting the inner lateral wall of the receptacle, with the bend further including a notch extending from the first face through the second face in the direction, and with the outer section of the resilient member being moved into the notch when the button is pressed in the direction.

6. The plug device as claimed in claim 1, with the socket member coupled to the frame, and with the second end of the plug member coupled to the temple or the head strap buckle.

7. The plug device as claimed in claim 1, with the socket member integrally formed with the frame as a single monolithic piece, and with the second end of the plug member coupled to the temple or the head strap buckle.

8. The plug device as claimed in claim 1, with the second end of the plug member coupled to the frame, and with the socket member coupled to the temple or the head strap buckle.

9. The plug device as claimed in claim 1, with the second end of the plug member integrally formed with the frame as a single monolithic piece, and with the socket member coupled to the temple or the head strap buckle.

* * * * *